United States Patent
Corpart et al.

(10) Patent No.: US 6,812,291 B1
(45) Date of Patent: Nov. 2, 2004

(54) METHOD FOR BLOCK POLYMER SYNTHESIS BY CONTROLLED RADICAL POLYMERIZATION FROM DITHIOCARBAMATE COMPOUNDS

(75) Inventors: Pascale Corpart, Sannois (FR); Dominique Charmot, Los Gatos, CA (US); Samir Zard, Gif sur Yvette (FR); Xavier Franck, Chevilly Larue (FR); Ghenwa Bouhadir, Gif sur Yvette (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/582,390

(22) PCT Filed: Dec. 23, 1998

(86) PCT No.: PCT/FR98/02867

§ 371 (c)(1),
(2), (4) Date: Sep. 11, 2000

(87) PCT Pub. No.: WO99/35177

PCT Pub. Date: Jul. 15, 1999

(30) Foreign Application Priority Data

Dec. 31, 1997 (FR) .............................. 97 16779
Jul. 30, 1998 (FR) .............................. 98 09780

(51) Int. Cl.$^7$ .............................................. C08F 293/00
(52) U.S. Cl. ...................... 525/244; 525/267; 525/286; 525/291; 525/293; 525/299; 525/308; 525/309
(58) Field of Search ................................. 525/244, 267, 525/286, 291, 293, 299, 308, 309

(56) References Cited

U.S. PATENT DOCUMENTS

| | | |
|---|---|---|
| 2,396,997 A | 3/1946 | Fryling et al. |
| 6,153,705 A | 11/2000 | Corpart et al. .............. 525/244 |

FOREIGN PATENT DOCUMENTS

| | | |
|---|---|---|
| EP | 296850 | 12/1988 |
| EP | 348166 | 12/1989 |
| EP | 421149 | 4/1991 |
| JP | 04198303 | 7/1992 |
| WO | WO96/15157 | 5/1996 |
| WO | WO98/01478 | 1/1998 |
| WO | WO99/31144 | 6/1999 |

OTHER PUBLICATIONS

"Synthesis and Photochemical reactions of polymers . . . " Bulletin of Tokyo Institute of technology, No. 78, 1996, pp. 1–16, XP002049822.

Moebius et al: "Beschleuniger Fuer Cyanacrylatklebstoffe" Paste und Kautschuk, vol. 39, No. 4, 1992, p. 122/123, XP002046219.

International search report corresponding to the instant application.

Primary Examiner—Jeffrey Mullis

(57) ABSTRACT

Chain end functionalized block copolymers having low polydispersity index are produced via controlled free radical polymerization of dithiocarbamates.

22 Claims, No Drawings

METHOD FOR BLOCK POLYMER SYNTHESIS BY CONTROLLED RADICAL POLYMERIZATION FROM DITHIOCARBAMATE COMPOUNDS

This application is an application under 35 U.S.C. Section 371 of International Application Number PCT/FR98/02867 filed on Dec. 23, 1998.

The present invention relates to a novel radical polymerization process for obtaining block copolymers.

Block polymers are usually prepared by ionic polymerization. This type of polymerization has several drawbacks:
- it only allows the polymerization of certain types of non-polar monomers, especially styrene and butadiene,
- it requires a particularly pure reaction mixture and temperatures which are often below room temperature so as to minimize parasitic reactions.

The operational constraints are therefore severe.

Radical polymerization has the advantage of being easily carried out without having to comply with excessive purity conditions, and at temperatures greater than or equal to room temperature. During this polymerization, macroradicals, which have a very short lifetime, recombine irreversibly by coupling or dismutation. When the polymerization takes place in the presence of several comonomers, the compositional variation of the mixture is infinitely low compared with the lifetime of the macroradical so that the chains have a random sequence of monomer units and not a block-type sequence.

Consequently, until recently a radical polymerization process allowing block polymers to be obtained did not exist.

Several approaches have been described for controlling radical polymerization. The most commonly cited consists in introducing, into the mixture, counter radicals which combine reversibly with the growing macroradicals, such as, for example, nitroxyl radicals (Georges et al., *Macromolecules*, 26, 2987, (1993)). This technique is characterized by high temperatures for labilizing the C—O bond.

Another method, called Atom Transfer Radical Polymerization, makes use of transition metal salts combined with organic ligands and an initiator generally consisting of an organic halide; control of the polymerization is made possible by the reversible activation of the C-halogen bond (K. Matyjaszewski, PCT WO 96/30421). One drawback with this polymerization is that it requires a stoichiometric quantity of metal per chain precursor.

Otsu (Otsu et al., *Makromol. Chem. Rapid Comm.*, 3, 127–132, (1982), Otsu et al. ibid, 3, 123–140, (1982), Otsu et al., *Polymer Bull.*, 7, 45, (1984), ibid, 11, 135, (1984), Otsu et al, *J. macromol. Sci. Chem.*, A21, 961, (1984) and Otsu et al., *Macromolecules*, 19, 2087, (1989)) has shown that certain organic sulphides, particularly dithiocarbamates, allowed chains to be grown in a controlled manner under UV irradiation, according to the principle:

Reaction 1

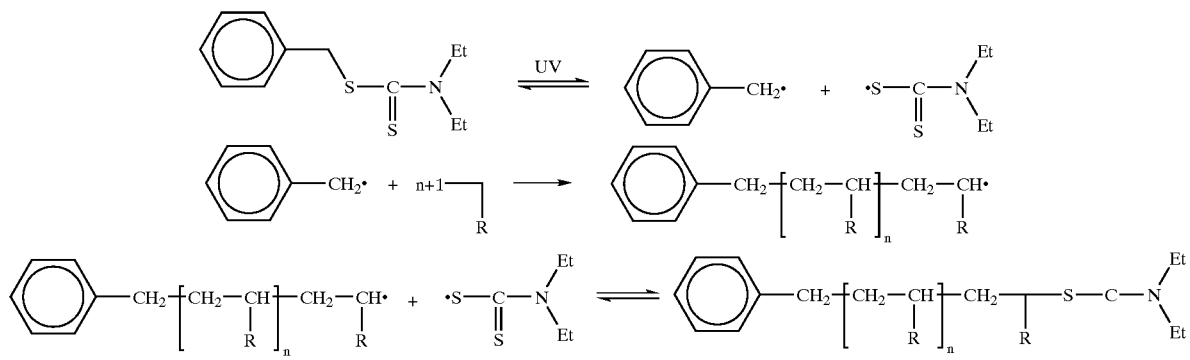

Since then, a new radical polymerization process has been developed, namely "controlled" or "living" radical polymerization. This controlled radical polymerization takes place by the growth, by propagation, of macroradicals.

At the present time, several controlled radical polymerization techniques are known, in which the ends of polymer chains may be reactivated in the form of a radical by homolytic bond (for example, C—O or C-halogen) scission.

Controlled radical polymerization therefore has the following distinct characteristics:
1. the number of chains is fixed throughout the duration of the reaction,
2. the chains all grow at the same rate, resulting in:
   a linear increase in the molecular masses with conversion,
   a narrow distribution of masses,
3. the average molecular mass is controlled by the monomer/chain-precursor molar ratio, and
4. the possibility of preparing block copolymers.

The controlled character is even more pronounced when the rate of consumption of the chain precursor is very much greater than the rate of growth of the chains (propagation). There are cases where this is not always true and conditions 1 and 2 are not observed, nevertheless it is always possible to prepare block copolymers.

The principle relies on the photolysis of the C—S bond, which regenerates the carbon macroradical, on the one hand, and the dithiocarbamyl radical, on the other hand. The controlled character of the reaction is due to the reversibility of the C—S bond under UV irradiation. It is thus possible to obtain block copolymers. On the other hand, the rate of exchange in propagating species and "dormant" species of reaction 1 above is not very large compared with the rate of propagation, this having the consequence of generating relatively broad molecular mass distributions. Thus, the polydispersity index (PI=$M_w/M_n$) is between 2 and 5 (Otsu et al., 25, 7/8, 643–650, (1989)).

Xanthate disulphides and dithiocarbamate disulphides are themselves well known as transfer agents in conventional radical polymerization in thermal mode and in the presence of an initiator, but no one has hitherto been able to control the polymerization, or even less to produce block copolymers.

Up till now it was known that disulphides (tetraalkylthiuram disulphide, diisopropylxanthate disulphide and mercaptobenzothiazol disulphide) were activatable thermally or under UV irradiation, whereas monosulphides (substituted xanthates, dithiocarbamates) were activatable only under UV irradiation (Roha et al., *Macromol. Symp.*, 91, 81–92, (1995), and Okawara et al., Bull. of the Tokyo Inst. of Techn., No. 78, 1966).

However, controlled radical polymerization making use of a UV irradiation source is very difficult to carry out, especially from an industrial standpoint, since the penetration of the UV photons into the polymerization medium is limited, both by absorption phenomena (most of the ethylenic monomers absorb in the 210–280 nm range) and by diffusion phenomena in disperse media (suspension, emulsion).

Moreover, it has been shown (Turner et al., *Macromolecules*, 23, 1856–1859, (1990)) that photopolymerization in the presence of dithiocarbamate generates carbon disulphide and may be accompanied by a loss of polymerization control.

For these reasons, it has thus been sought to develop a technique which can be used to obtain block copolymers by a process without UV irradiation, preferably by thermal initiation. Until the present time, no controlled radical polymerization system has been able to be demonstrated using dithiocarbamate compounds in the absence of a UV source.

Document WO 98/01478 describes a process for preparing block polymers by controlled radical polymerization. According to that document, such a process cannot be implemented with the aid of compounds, called chain-transfer agents, chosen from dithiocarbamates, of general formula:

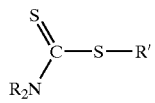

Controlled radical polymerization has an advantage over conventional radical polymerization when it is a question of preparing low-molecular-weight functionalized chains (reactive telomers). Such polymers are desirable for specific applications such as, for example, coatings and adhesives.

Thus, when it is attempted to synthesize chains grafted with, on average, 2 functional comonomers, the fraction of chains with at most one functional site becomes large when the average degree of polymerization is less than a threshold value (e.g. 20 or 30). Controlled radical polymerization makes it possible to reduce, or even to inhibit, the formation of these oligomers having zero or one functional site which degrade the performance in terms of application.

One object of the present invention is to provide a novel controlled radical polymerization process for the synthesis of block polymers from dithiocarbamates.

Another object of the present invention is to provide a novel controlled radical polymerization process for the synthesis of block polymers from dithiocarbamates in the absence of a UV source.

Another object is to provide a controlled radical polymerization process for the synthesis of block polymers from all types of monomers.

Another object is to provide a controlled radical polymerization process for the synthesis of block polymers containing no metal impurities deleterious to their use.

Another object is to provide a controlled radical polymerization process for the synthesis of block copolymers, the said polymers being chain-end functionalized.

Another object is to provide a controlled radical polymerization process for the synthesis of block polymers and block copolymers having a low polydispersity index.

Another object is to provide a controlled radical polymerization process for the synthesis of oligomers in which the number of functional units is constant from chain to chain.

To these ends, the invention relates to a process for preparing block polymers of general formula (IA) or (IB):

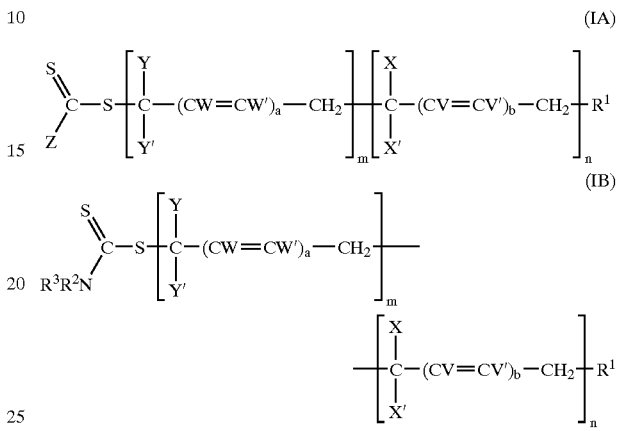

in which formulae:

$R^1$ represents:
  an optionally substituted alkyl, acyl, aryl, alkene or alkyne group (i), or
  an optionally substituted or aromatic, saturated or unsaturated, carbocycle (ii), or
  an optionally substituted or aromatic, saturated or unsaturated, heterocycle (iii),
it being possible for these groups and rings (i), (ii) and (iii) to be substituted with substituted phenyl groups, substituted aromatic groups, or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, organosilyl, groups having a hydrophilic or ionic character, such as the alkali metal salts of carboxylic acids, the alkali metal salts of sulphonic acid, polyalkylene oxide chains (PEO, PPO), cationic substituents (quaternary ammonium salts),
R representing an alkyl or aryl group,
Z is an optionally substituted ring comprising a nitrogen atom via which Z is linked to the C(=S)—S-group of formula (IA), the other atoms of the said ring inducing a delocalizing or electron-withdrawing effect with respect to the electron density of the nitrogen atom,
$R^2$ and $R^3$, which are identical or different, represent:
  an optionally substituted alkyl, acyl, aryl, alkene or alkyne group (i), or
  an optionally substituted or aromatic, saturated or unsaturated, carbocycle (ii), or
  an optionally substituted, saturated or unsaturated, heterocycle (iii),
it being possible for these groups and rings (i), (ii) and (iii) to be substituted with:
  substituted phenyl groups or substituted aromatic groups, groups: alkoxycarbonyl or aryloxycarbonyl (—COOR), carboxyl (—COOH), acyloxy (—O$_2$CR), carbamoyl (—CONR$_2$) cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR2), halogen, allyl, epoxy, alkoxy (—OR), S-alkyl, S-aryl, groups having a hydrophilic or ionic character, such as the alkali metal salts of carboxylic acids, the alkali metal salts of sulphonic acid, polyalkylene oxide chains (PEO, PPO), cationic substituents (quaternary ammonium salts), R representing an alkyl or aryl group, and, for at least $R^2$ or $R^3$, these groups and rings (i), (ii) and (iii) induce a delocalizing or electron-withdrawing effect with respect to the electron density of the nitrogen atom to which $R^2$ and $R^3$ are linked, V, V', W and W', which are identical or different, represent: H, an alkyl group or a halogen, X, X', Y and Y', which are identical or different, represent H, a halogen or a group chosen from R', OR', OCOR', NHCOH, OH, NH$_2$, NHR', N(R')$_2$, (R')$_2$N$^+$O$^-$, NHCOR', CO$_2$H, CO$_2$R', CN, CONH$_2$, CONHR'or CONR'$_2$, in which R'is chosen from alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups, a and b, which are identical or different, are equal to 0 or 1, m and n, which are identical or different, are greater than or equal to 1 and, when one or other is greater than 1, the individual repeat units are identical or different, in which process the following are brought into contact with each other:

an ethylenically unsaturated monomer of formula:

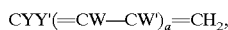

a precursor compound of general formula (IIA) or (IIB):

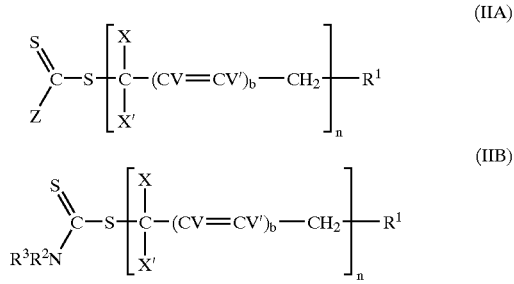

in which Z, X, X', V, V', $R^1$, $R^2$ and $R^3$ have the same meaning, and b and n the same value, as previously, a radical polymerization initiator.

The process therefore consists in bringing into contact with each other a radical polymerization initiator, an ethylenically unsaturated monomer and a precursor of general formula (IIA) or (IIB).

The radical polymerization initiator may be chosen from the initiators conventionally used in radical polymerization. These may, for example, be one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutyrate, lauroyl peroxide, tert-amyl peroxypivalate, tert-butyl peroxypivalate, dicumyl peroxide, benzoyl peroxide, potassium persulphate and ammonium persulphate;

azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(tert-butylazo)-2-cyanopropane, 2,2'-azobis(2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisdbutyramidine) dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] and 2,2'-azobis(isobutyramide)dihydrate;

redox systems including combinations such as:

mixtures of hydrogen peroxide or alkyl peroxide, peresters, percarbonates and the like and of any one of the salts of iron, titanous salts, zinc formaldehyde sulphoxylate or sodium formaldehyde sulphoxylate, and reducing sugars;

alkali-metal or ammonium persulphates, perborates or perchlorates in combination with an alkali metal bisulphite, such as sodium metabisulphite, and reducing sugars;

alkali-metal persulphates in combination with an arylphosphinic acid, such as benzenephosphonic acid and other similar acids, and reducing sugars.

Preferably, the amount of initiator to be used is determined so that the amount of radicals generated is at most 25 mol % with respect to the amount of compound (IIA) or (IIB), even more preferably at most 15 mol %.

As ethylenically unsaturated monomer, the monomers chosen from styrene or its derivatives, butadiene, chloroprene, (meth)acrylic esters, vinyl esters and vinyl nitrites are more specifically used according to the invention.

Butadiene and chloroprene correspond to the case in which a and b=1 in the formulae (IA), (IB), (IIA) or (IIB) and in the formula for the monomer given above.

"(Meth)acrylic esters" should be understood to mean esters of acrylic acid and of methacrylic acid with hydrogenated or fluorinated $C_1$–$C_{12}$, preferably $C_1$–$C_8$, alcohols. Among compounds of this type, mention may be made of: methyl acrylate, ethyl acrylate, propyl acrylate, n-butyl acrylate, isobutyl acrylate, 2-ethylhexyl acrylate, tert-butyl acrylate, methyl methacrylate, ethyl methacrylate, n-butyl methacrylate and isobutyl methacrylate.

The vinyl nitrites include more particularly those having from 3 to 12 carbon atoms, such as, in particular, acrylonitrile and methacrylonitrile.

It should be noted that styrene may be replaced, completely or partly, by derivatives such as alpha-methylstyrene or vinyltoluene.

The other ethylenically unsaturated monomers which can be used, alone or as mixtures, or which can be copolymerized with the above monomers, are, in particular:

vinyl esters of carboxylic acid, such as vinyl acetate, vinyl Versatate® and vinyl propionate;

vinyl halides;

ethylenically unsaturated monocarboxylic and dicarboxylic acids, such as acrylic acid, methacrylic acid, itaconic acid, maleic acid and fumaric acid, and monoalkyl esters of dicarboxylic acids of the type mentioned with alkanols preferably having from 1 to 4 carbon atoms and their N-substituted derivatives;

amides of unsaturated carboxylic acids, such as acrylamide, methacrylamide, N-methylolacrylamide or methacrylamide, and N-alkylacrylamides;

ethylenic monomers containing a sulphonic acid group and its ammonium or alkali metal salts, for example vinylsulphonic acid, vinylbenzenesulphonic acid, α-acrylamidomethylpropanesulphonic acid and 2-sulphoethylene methacrylate;

amides of vinylamine, especially vinylformamide or vinylacetamide; and unsaturated ethylenic monomers containing a secondary, tertiary or quaternary amino group, or a heterocyclic group containing nitrogen, such as, for example, vinylpyridines, vinylimidazole, aminoalkyl (meth)acrylates and aminoalkyl (meth)acrylamides such as dimethylaminoethyl (meth)acrylate, di-tert-butylaminoethyl (meth)acrylate and dimethylamino (meth)acrylamide. Likewise, it is possible to use zwitterionic monomers such as, for example, sulphopropyl (dimethyl)aminopropyl acrylate.

In order to prepare the copolymers of formula (IA) or (IB) for which Y=H and Y'=NH$_2$, it is preferred to use as ethylenically unsaturated monomers the amides of vinylamine, for example vinylformamide or vinylacetamide. The copolymer obtained is then hydrolysed to acid or basic pH.

In order to prepare the copolymers of formula (IA) or (IB) for which Y=H and Y'=OH, it is preferred to use as ethylenically unsaturated monomers vinyl esters of carboxylic acid such as, for example, vinyl acetate. The copolymer obtained is then hydrolysed to acid or basic pH.

The types and amounts of copolymerizable monomers employed according to the present invention vary depending on the particular final application for which the block polymer is intended. These variations are well known and may be easily determined by those skilled in the art.

In order for the polymer of general formula (IA) or (IB) to be a block polymer, the "precursor" co und of general formula (IIA) or (IIB) must be a polymer. Thus, n is greater than or equal to 1, preferably greater than 5. The monomer units of this polymer may be identical or different.

The essential characteristic of the invention stems from the nature of this precursor of general formula (IIA) or (IIB). This precursor (IIA) or (IIB) forms part of the family of dithiocarbamates, the functional group of which is:

In the case of copolymers of formula (IA) or of precursor polymers of formula (IIA), the nitrogen atom of the dithiocarbamate functional group must form part of a ring and the other atoms of the said ring must exhibit an electron-withdrawing effect on the doublet of the nitrogen of the dithiocarbamate functional group.

The nature of this ring Z, comprising the nitrogen of the dithiocarbamate functional group, can vary, given that there is an electron-withdrawing effect on the doublet of the nitrogen.

On account of the process, the multiblock polymers of formula (IA) have the same characteristics with regard to the ring Z.

In compounds of formula (IA) and (IIA), the ring Z is a ring based on carbon atoms.

This carbocycle may include at least one heteroatom other than the nitrogen which links the ring to —C(=S)—S—; this heteroatom may be chosen from O, S, N and/or P. Preferably it is O or N.

The ring Z may be an aromatic or heteroaromatic ring.

The ring Z may be functionalized and comprise at least one of the following functional groups: carbonyl (C=O). SO$_2$, POR", R" representing an alkyl, aryl, OR, SR or NR$_2$ group, where R represents an alkyl or aryl group, these being identical or different. Preferably, the functionalized group is carbonyl.

It is also preferable for the functionalized group to be directly linked to the nitrogen of the dithiocarbamate functional group.

The ring Z may be substituted with at least one of the following groups: alkyl, aryl, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups having a hydrophilic or ionic character, such as the alkali metal salts of carboxylic acids or the alkali metal salts of sulphonic acid, polyalkylene oxide chains (PEO, PPO), cationic substituents (quaternary ammonium salts), R representing an alkyl or aryl group.

The ring Z may also be substituted with at least one carbocycle or a heterocycle; this being optionally aromatic and/or substituted with one of the preceding groups. In the latter case, and according to a preferred variant, the ring Z and its cyclic substituent have two common atoms.

The ring Z is preferably chosen from one of the following rings:

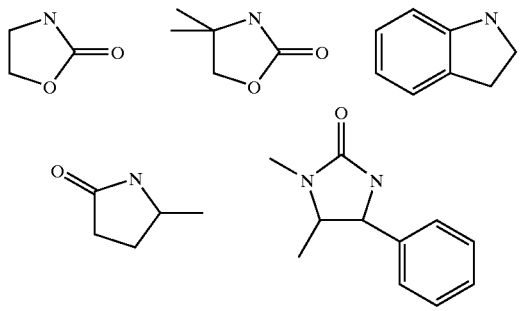

Likewise, in the case of copolymers of formila (IB) or of precursor polymers of formula (IIB), the nitrogen atom of the dithiocarbamate functional group must be linked to R$^2$ and R$^3$ groups, at least one of which induces a delocalizing or electron-withdrawing effect with respect to the electron density of the nitrogen atom of the dithiocarbamate functional group.

According to a first variant, R$^2$ and/or R$^3$ exert a π withdrawing effect. For this purpose, R$^2$ and/or R$^3$ may represent a carbonyl or (hetero)aromatic group.

According to a second variant, R$^2$ and/or R$^3$ exert a Σ withdrawing effect. For this purpose, R$^2$ and/or R$^3$ may represent an alkyl group substituted with electron-withdrawing groups.

With regard to the substituent R$^1$ of the compounds of formula (IA), (IB), (IIA) and (IIB), it preferably represents:

a group of formula CR$^{11}$R$^{12}$R$^{13}$, in which:

R$^{11}$, R$^{12}$ and R$^{13}$ represent groups (i), (ii) or (iii) as defined above, or R$^{11}$=R$^{12}$=H and R$^{13}$ is an aryl, alkene or alkyne group, or a —COR¹⁴ group in which R¹⁴ represents a group (i), (ii) or (iii) as defined above.

It may especially be chosen from the following groups:

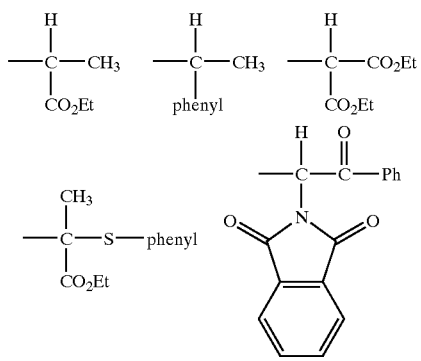

The precursor polymer of formula (IIA) may come from the radical polymerization of an ethylenically unsaturated monomer of formula: $CXX'(=CV-CV')_b=CH_2$ by bringing the said monomer into contact with a radical polymerization initiator and a compound of general formula (IIIA) or (IVA):

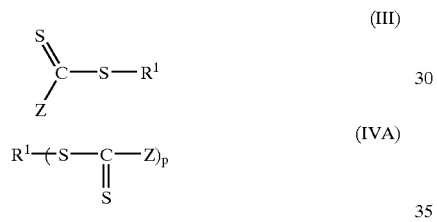

p being between 2 and 10, preferably between 2 and 5.

In the general formulae (IIIA) or (IVA), the symbols Z and R¹ have the same meaning as previously. The preferences with regard to its symbols are the same as above.

Among compounds of formula (IVA), when p=2, R¹ may be chosen from the groups —CH₂-phenyl-CH₂— or —(CH₂)$_q$—, where q is between 2 and 10.

According to the preferred variants, the compound of formula (IIIA) is chosen from those of the following formulae (A) to (E):

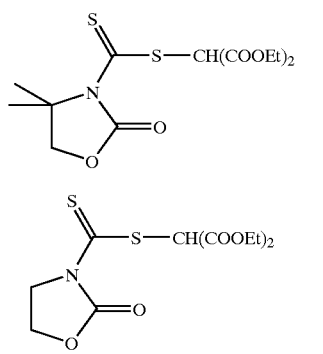

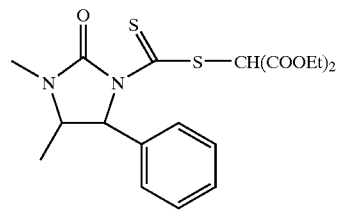

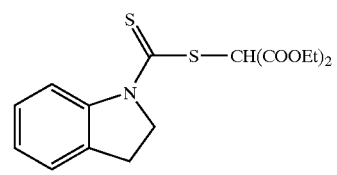

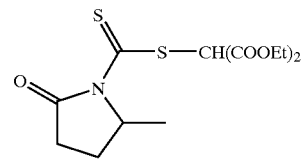

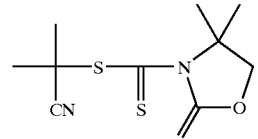

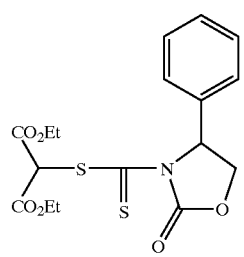

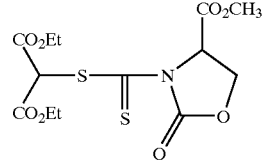

Likewise, the precursor compound of general formula (IIB) may come from the radical polymerization of an ethylenically unsaturated monomer of formula: $CXX'(=CV-CV')_b=CH_2$ during which the said monomer is brought into contact with a radical polymerization initiator and a compound of general formula (IIIB), (IVB) or (VB):

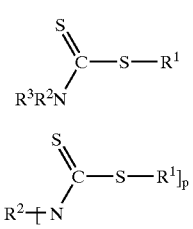

-continued

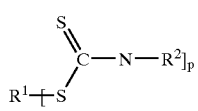
(VB)

p being between 2 and 10.

In the general formulae (IIIB), (IVB) or (VB), the symbols $R^1$, $R^2$ and $R^3$ have the same meaning as previously. The preferences with regard to its symbols are the same as above.

According to the preferred variants, the compound of formula (IIIB) is chosen from the compounds of the following formulae:

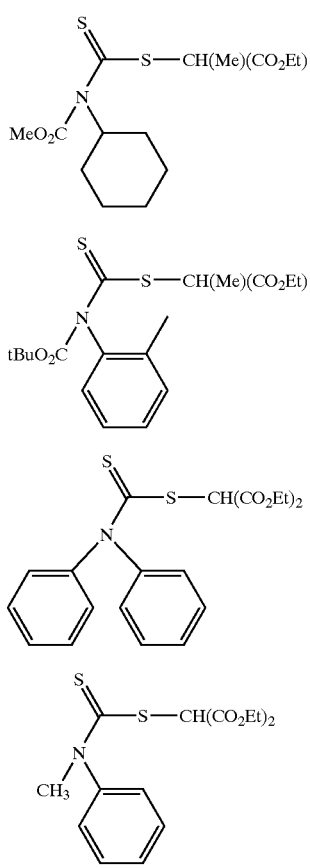

The compounds of formula (IIIA) or (IIIB) are generally obtained by the reaction of the corresponding amine with $CS_2$ so as to obtain the salts of formulae:

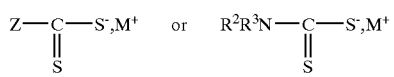

in which M represents sodium, potassium or lithium.

This salt is then brought into contact with a halogen-containing derivative Hal-$R^1$ (Hal represents Cl, Br or I) in order to give the precursor of formula (IIIA) or (IIIB).

During the synthesis of the precursor polymer of formula (IIA) or (IIB), the radical polymerization initiators and the ethylenically unsaturated monomers are of the type of those mentioned previously.

The complete process of synthesizing a block polymer of formula (IA) or (IB) according to the invention may therefore consist in:

(1) synthesizing a polymer by bringing into contact with each other an ethylenically unsaturated monomer of formula: $CXX'(=CV-CV')_b=CH_2$, a radical polymerization initiator and a compound of formula (IIIA), (IIIB), (IVA), (IVB) or (VB), and (2) using this polymer obtained at step (1) as precursor of general formula (IIA) or (IIB) in order to prepare a diblock polymer by bringing it into contact with a new ethylenically unsaturated monomer of formula: $CYY'(=CW-CW')_b=CH_2$ and a radical polymerization initiator.

This step (2) may be repeated as many times as desired using new monomers to synthesize new blocks and to obtain a multiblock polymer.

As indicated previously, for the preparation of precursors of formula (IIA) or (IIB) for which X=H and X'=$NH_2$, it is preferred to use, as ethylenically unsaturated monomers, amides of vinylamine, for example vinylformamide or vinylacetamide. The polymer obtained is then hydrolysed to acid or basic pH.

Likewise, for the preparation of precursors of formula (IIA) or (IIB) for which X=H and X'=OH, it is preferred to use vinyl esters of carboxylic acids, such as vinyl acetate for example, as ethylenically unsaturated monomers. The polymer obtained is then hydrolysed to acid or basic pH.

According to this principle, the invention therefore also relates to a process for preparing multiblock polymers, in which the implementation of the process previously described is repeated at least once, using:

different monomers from those of the evious implementation, and instead of the precursor compound of rmula (IIA) or (IIB), the block polymer coming from the previous implementation.

If the implementation is repeated once, a triblock polymer will be obtained, if it is repeated twice, a "quadriblock" polymer will be obtained, and so on. In this way, at each new implementation, the product obtained is a block polymer having an additional polymer block.

Therefore, in order to prepare multiblock polymers, the process consists in repeating, several times, the implementation of the preceding process on the block polymer coming from each previous implementation using different monomers.

According to this method of preparing multiblock polymers, when it is desired to obtain homogeneous block polymers without a composition gradient, and if all the successive polymerizations are carried out in the same reactor, it is essential for all the monomers used in one step to have been consumed before the polymerization of the next step starts, therefore before the new monomers are introduced.

The compounds of formula (IVA) and (IVB) are particularly advantageous as they allow a polymer chain to be grown on at least two active sites. With this type of compound, it is possible to save on polymerization steps in order to obtain an n-block copolymer.

Thus, if p=2, the first block is obtained by the polymerization of a monomer M1 in the presence of the compound of formula (IVA) or (IVB). This first block may then grow at each of its ends by the polymerization of a second monomer M2. A triblock copolymer is obtained. This triblock polymer itself may grow at each of its ends by the polymerization of a third monomer M3. Thus, a "pentablock" copolymer is obtained in only three steps.

If p is greater than 2, the process makes it possible to obtain homopolymers or block copolymers whose structure is "multi-branched" or hyperbranched.

The polymerization is carried out according to any method known to those skilled in the art. It may be carried out in bulk, in solution or in emulsion. The temperature may vary between ambient temperature and 150° C., depending on the nature of the monomers used. The process is carried out in the absence of a UV source.

The process according to the invention has the advantage of resulting in block polymers having a low polydispersity index.

It also makes it possible to control the molecular mass of the polymers.

The invention therefore also relates to the block polymers which can be obtained by the above process.

In general, these polymers have a polydispersity index (PI) of at most 2, preferably of at most 1.5.

The preferred block polymers are those having at least two polymer blocks chosen from the following combinations:

polystyrene/polymethyl acrylate, polystyrene/polyethyl acrylate, polystyrene/poly(tert-butyl acrylate), polyethyl acrylate/polyvinyl acetate, polybutyl acrylate/polyvinyl acetate, poly(tert-butyl acrylate)/polyvinyl acetate.

Finally, the process for synthesizing the precursor polymers of general formula (IIA) or (IIB) also makes it possible to synthesize polymers having a low polydispersity index. In general, these precursor polymers have a polydispersity index of at most 2, preferably of at most 1.5.

Preferably, for these precursor polymers of general formula (IIA) or (IIB), n is greater than or equal to 6.

The following examples illustrate the invention without, however, limiting the scope thereof.

EXAMPLES

1. Synthesis of the Precursor Compounds of Formula (IIIA) or (IIIB)

Example 1.1

Synthesis of Dithiocarbamate of Formula (A)

Dissolved in a round-bottomed flask are 17.8 g of 2-amino-2-methyl-1-propanol in 100 ml of a 0.1M solution of sodium ethanolate in ethanol. Next, 24 ml of diethyl carbonate are added and the solution obtained is stirred for 24 hours. The solvent is then evaporated. After drying, 17.26 g of 5,5-dimethyl-2-oxazolidone are obtained with a yield of 75%.

5.28 g of a 50% dispersion of sodium hydride are washed with pentane and added to this is a THF/DMSO mixture (100 ml THF/100 ml DMSO). This solution is cooled to 0° C. and added to it are 11.5 g of 5,5-dimethyl-2-oxazolidone obtained from the first step. The cooling system is interrupted and the reaction mixture is stirred for 1 h 30 minutes and then a white precipitate appears. The temperature is again lowered to 0° C. and 1 equivalent of $CS_2$ (7.6 g) is added. The solution turns a red colour and the stirring is continued until the reaction mixture is perfectly clear (approximately 3 hours). The solution is then taken up in water and extracted with dichloromethane.

The aqueous phase is recovered and added to this are 50 ml of ethanol and 16.2 ml of diethyl chloromalonate. Stirring continues overnight at room temperature and the yellow solution obtained is concentrated in vacuo before being taken up in a saturated aqueous sodium chloride solution. Finally, it is extracted with ether.

7.9 g of dithiocarbamate of formula (A) are isolated by column chromatography. The yield is 23%.

Example 1.2

Synthesis of Dithiocarbamate of Formula (B)

2.6 g of a 50% dispersion of sodium hydride are washed with pentane and then introduced into a THF/DMSO mixture (200 ml THF/200 ml DMSO). Next, 4.35 g of oxazolidone are added and the solution is stirred for an hour at room temperature. A white precipitate appears.

The reaction mixture is then cooled to −20° C. and 3.6 ml of $CS_2$ are added. The solution turns orange and is stirred for 10 minutes at −20° C. and then for 2 hours at 0° C. The reaction mixture is again cooled to −20° C. and 4 ml of diethyl chloromalonate are added. The solution is stirred for 10 minutes at −20° C., 1 hour at 0° C. and 1 hour at room temperature.

The reaction mixture is taken up in ether and the organic phase is washed with water and then with a saturated sodium chloride solution.

2.6 g of dithiocarbamate of formula (B) are isolated by column chromatography. The yield is 23%.

Example 1.3

Synthesis of Dithiocarbamate of Formula (C)

66 g of ephedrine are mixed with 72 g of urea. The mixture is heated at 170° C. for 30 minutes and then at 200° C. for 2 hours. After cooling to room temperature, 200 ml of water are added. The white precipitate which forms is filtered and washed with a 5% aqueous hydrochloric acid solution and then recrystallized in ethanol. 28 g of 1,5-dimethyl-4-phenyl-2-imidazolidone are obtained with a yield of 37%.

2.6 g of a 50% dispersion of sodium hydride are washed with pentane and a THF/DMSO mixture (200 ml THF/200 ml DMSO) is added. 9.5 g of 1,5-dimethyl-4-phenyl-2-imidazolidone obtained previously are added and the solution is stirred for 1 hour at room temperature. The reaction mixture is then cooled to 0° C. and 3 ml of $CS_2$ are added. The solution turns orange and is stirred at 0° C. for 2 hours. The reaction mixture is taken up in 100 ml of water and extracted with dichloromethane.

The aqueous phase is recovered and 100 ml of ethanol and then 4 ml of diethyl chloromalonate are added. Stirring continues for 2 hours and the reaction mixture is taken up in ethyl acetate. The organic phase thus obtained is washed with water and then with a saturated sodium chloride solution before being concentrated in vacuo.

4.5 g of dithiocarbamate of formula (C) are isolated by column chromatography. The yield is 42%.

Example 1.4

Synthesis of Dithiocarbamate of formula (D)

2.6 g of a 50% dispersion of sodium hydride are washed with pentane and then a THF/DMSO mixture (50 ml THF/50 ml DMSO) is added. Next, 5.5 ml of indoline are added to the mixture and the solution is stirred for 1 hour at room temperature.

It is then cooled to 0° C. and 3.6 ml of $CS_2$ are added. The solution turns orange and is stirred at 0° C. for 2 hours. The reaction mixture is taken up in 100 ml of water and washed with dichloromethane.

The aqueous phase is recovered and 100 ml of ethanol and 6.4 ml of diethyl chloromalonate are added. The solution is stirred for 2 hours and then taken up in ether. The organic phase thus obtained is washed with water and then with a saturated sodium chloride solution before being concentrated.

11 g of dithiocarbamate of formula (D) are isolated by column chromatography in the form of yellow crystals. The yield is 79%.

Example 1.5

Synthesis of Dithiocarbamate of Formula (E)

1 g of 5-methyl-2-pyrrolidinone is added to 20 ml of a 1/1 THF/DMSO mixture. 0.56 g of potassium hydroxide and then 1 ml, of water and 0.6 ml of $CS_2$ are added to the solution. The reaction mixture is stirred for 1 hour; the solution turns reddish black.

It is cooled to 0° C. and 1 ml of diethyl chloromalonate is added. Stirring is continued for 30 minutes at 0° C. and then for 2 hours at room temperature. The reaction mixture is taken up in water and extracted with ethyl acetate. The organic phase is recovered and washed with water and then with a concentrated sodium choride solution before being concentrated in vacuo.

0.86 g of dithiocarbamate of formula (E) is isolated by column chromatography in the form of a yellow oil. The yield is 26%.

Example 1.6

Synthesis of Dithiocarbamate of Formula (F)

1.76 g of a 50% dispersion of NaH (30 mmol) are washed with pentane and then 50 ml of THF and 50 ml of DMSO are added. This solution is cooled to 0° C. and then 3.8 g of imidazolidinone (30 mmol) are added. The cold bath is removed.

After 1 h 30 min., a white precipitate is formed. The mixture is cooled to 0° C. and $CS_2$ is then added. The solution turns red and stirring continues until the solution is clear (3 hours).

The solution is then hydrolysed using water and extracted with dichloromethane. 200 ml of acetone are added to the aqueous phase followed by 4.2 g of iodine.

After stirring for 2 hours at room temperature, the solution obtained is yellow; it is concentrated in vacuo before being diluted in a saturated NaCl solution and extracted with ether.

Purification of the crude reaction product using column chromatography (heptane/ethyl acetate in a ratio of 9/1) makes it possible to isolate 4.2 g of dimer. The yield is 67%.

2 g of dimer (5.2 mmol) are dissolved in ml of 1,2-dichloroethane. 1.12 g (6.8 mmol) of AIBN are added and the solution is heated at reflux under argon for 6 hours. The solvent is then evaporated and the crude reaction product is purified by column chromatography (dichloromethane/heptane in a ratio of 9/1 and then 7/3). 2.34 g of dithiocarbamate of formula (F) are obtained, i.e. a yield of 33%.

Example 1.7

Synthesis of Dithiocarbamate of Formula (G)

6.8 g of phenylglycinol (50 mmol) are dissolved in a round-bottomed flask containing 50 ml of a 0.2M solution of EtONa in ethanol (prepared by adding mmol of NaH to 50 ml of ethanol). Added to this solution are 6 ml of diethyl carbonate (50 mmol). The solution is stirred for 24 hours and the solvent is then evaporated. The residue is diluted using a saturated aqueous NaCl solution and extracted with ethyl acetate.

After drying and evaporation, the crude reaction product is purified by column chromatography (dichloromethane/ethyl acetate in a ratio of 95/5). 4.6 g of oxazolidinone are obtained, i.e. a yield of 56%.

0.53 g of a 50% dispersion of NaH (11 mmol) is washed with pentane and then 20 ml of THF and 20 ml of DMSO are added. Next, 1.6 g of oxazolidinone (10 mmol) are added. After 30 minutes of reaction, 200 ml of ether are added, causing two phases to form. The supernatant phase is removed and the residue is taken up in acetone and then precipitated by adding ether. The supernatant phase is again removed.

100 ml of acetone are added to the residue, followed by 1.12 ml (7 mmol) of diethyl chloromalonate. After 3 hours of stirring at room temperature, the yellow solution obtained is concentrated in vacuo. Next, it is diluted in a saturated NaCl solution and then extracted with ether.

The crude reaction product is purified by column chromatography (heptane/ethyl acetate in a ratio of 7/3); 0.94 g of dithiocarbamate of formula (G) is isolated. The yield is 33%.

Example 1.8

Synthesis of Dithiocarbamate of Formula (H)

15.5 g of serine methyl ester hydrochloride (100 mmol) are dissolved in a round-bottomed flask containing 140 ml of water. 10.5 g of $KHCO_3$ (105 mmol) are added and then, after 10 minutes, 14.6 g of $K_2CO_3$ are added. The solution is cooled to 0° C. and then 70 ml of phosgene (133 mmol of a 1.9M solution in toluene) are slowly added over 20 minutes. The solution is stirred overnight at room temperature. Two phases are obtained which are separated; the aqueous phase is evaporated and the residue is taken up in ethyl acetate. The organic phase is concentrated in order to give 14.3 g of intermediate oxazolidinone, i.e. a yield 99%.

1.45 g of oxazolidinone (10 mmol) are dissolved in 20 ml of DMF and then 1.2 ml (20 mmol) of $CS_2$ are added. The solution is cooled to 0° C. and then 0.48 g (10 mmol) of NaH is added. The solution is stirred for 30 minutes at 0° C. and then for 30 minutes at room temperature. It is again cooled to 0° C. and 0.8 ml (5 mmol) of diethyl chloromalonate is added to it. After stirring for 30 minutes at 0° C. and then for 30 minutes at room temperature, the solution is diluted in ethyl acetate. Next, it is washed with water and then with brine. The organic phase is concentrated in vacuo. The crude reaction product is purified by column chromatography (heptane/ethyl acetate in a ratio of 7/3); 1.2 g of dithiocarbamate of formula (H) are isolated. The yield is 64%.

Example 1.9

Synthesis of Dithiocarbamate of Formula (I)

4.6 ml of cyclohexylamine (40 mmol) dissolved in 40 ml of ethyl ether are introduced into a round-bottomed flask and then 5.5 ml of triethylamine (40 mmol) and 3.5 ml (45 mmol) of methyl chloroformate are added. After three hours of reaction, the solution is hydrolysed by adding water, the organic phase is washed with a saturated 1N HCl solution of $NaHCO_3$ and then with brine. The organic phase is dried over magnesium sulphate and concentrated in vacuo in order to give 5.9 g (94%) of intermediate carbamate.

1.57 g (10 mmol) of this intermediate carbamate are dissolved in 20 ml of DMF and 1.2 ml (20 mmol) of $CS_2$ are then added. The solution is cooled to 0° C. and 0.48 g (10 mmol) of a 50% dispersion of NaH is added. After one hour at 0° C., the solution containing the sodium salt is added to a solution of 1.24 ml (9.5 mmol) of ethyl 2-bromopropionate in 20 ml of DMF at 0° C.

After stirring for two hours at room temperature, a yellow solution is obtained which is diluted by adding ethyl ether and hydrolysed by adding water. The organic phase is washed with water and then with brine before being dried and concentrated in vacuo.

The crude reaction product is purified by column chromatography (heptane/ethyl acetate in a ratio of 9/1); 1.6 g of dithiocarbamate of formula (I) are isolated. The yield is 50%.

Example 1.10

Synthesis of Dithiocarbamate of Formula (J)

0.58 g (3 mmol) of intermediate carbamate (prepared from o-toluidine and $(Boc)_2O$ (di-tert-butyl dicarbonate)) is dissolved in 10 ml of DNF and then 0.35 ml (6 mmol) of $CS_2$ is added. The solution is cooled to 0° C. and 0.144 g (3 mmol) of a 50% dispersion of NaH is added. After one hour at 0° C., the solution containing the sodium salt is slowly added to a solution of 0.39 ml (3 mmol) of ethyl 2-bromopropionate in 10 ml of DMF at 0° C.

After stirring for 2 hours at room temperature, the yellow solution obtained is diluted by adding ethyl ether and hydrolysed by adding water. The organic phase is washed with water and then with brine before being dried and concentrated in vacuo.

The crude reaction product is column purified (heptane/ethyl acetate in a ratio of 9/1); 0.68 g of dithiocarhamate of formula (J) is isolated. The yield is 61%.

Example 1.11

Synthesis of Dithiocarbamate of Formula (K)

1.3 equivalents of NaH (1.24 g; 26 mmol) are suspended in 10 ml of THF in a round-bottomed flask ok placed under argon. 1 equivalent of diphenylamine (3.38 g; 20 mmol) dissolved in a mixture of 18 ml of DMSO and 9 ml of THF is added at 0° C. The colour turns a pale green.

After stirring for one hour, 2.36 equivalents of $CS_2$ (2.84 ml; 47.2 mmol) are added and the solution becomes orangey yellow. After stirring for 30 minutes, the solution is cooled to −20° C. and 1 equivalent of a chlorinated agent (3.20 ml; 20 mmol) is added. The solution is stirred for two hours at room temperature. Next, it is hydrolysed, extracted with ethyl ether and then dried over magnesium sulphate and concentrated in vacuo.

The product is isolated. It is in the form of a beige solid (melting point: 65° C.). The yield is 85% without purification.

Example 1.12

Synthesis of Dithiocarbamate of Formula (L)

1.3 equivalents of NaH (1.24 g; 26 mmol) are suspended in 10 ml of THF in a round-bottomed flask under argon. 1 equivalent of methylphenylamine (2.16 ml; 20 mmol) dissolved in a mixture of 20 ml of DMSO and 10 ml of THF is added drop by drop, at room temperature. The mixture is heated at THF reflux for 10 minutes. The colour turns yellowish green.

After stirring for one hour, 2.36 equivalents of $CS_2$ (2.84 ml; 47.2 mmol) are added at 0° C. The solution then becomes brownish red. After stirring for 30 minutes, the solution is cooled to −15° C. and 1 equivalent of a chlorinated agent (3.20 ml; 20 mmol) is added. The solution becomes brownish yellow; it is stirred for 2 hours at room temperature. Next, it is hydrolysed, extracted with ethyl ether, then dried over magnesium sulphate and concentrated in vacuo.

After purification by column chromatography (heptane/ethyl acetate: 9/1), 4.42 g of product are isolated. It is in the form of a yellow oil. The yield is 70%.

2. Preparation of Homopolymers of Formula (IIA) or (IIB)

These examples demonstrate that the radical polymerization is controlled by the use of precursors of general formula (III). The control character of the reaction appears through the values of the polydispersity indices $PI=M_w/M_n$, which are less than 1.5, and the values of the number-average molecular mass $M_n$, which are close to the theoretical values and expressed by the following formula:

$$M_n = \frac{M_m x}{M_p 100} M_{\text{mol}}$$

where:. $M_n$: moles of monomer $M_p$: moles of precursor of formula (III)

x: conversion of the monomer (%)

$M_{mol}$: molecular mass of the monomer (g/mol).

Example 2.1

Styrene Homopolymer

Introduced into a 10 ml round-bottomed flask are:

1 mmol of dithiocarbamate of formula (A) (0.35 g) and 40 mmol of styrene (4.16 g).

The temperature is raised to 95° C. and 0.03 mmol of lauroyl peroxide (12.8 mg) is added. The polymerization lasts 12 hours, during which 0.02 mmol of lauroyl peroxide is added every two hours.

The polymer is recovered by evaporating the traces of residual monomer and analysed by GPC in a THF medium and in polystyrene equivalents.

GPC analysis of the homopolymer obtained above allows its number-average mass $M_n$ to be measured. It also allows its weight-average mass $(M_w)$ to be measured and hence the polydispersity index (PI), corresponding to the ratio of $M_w$ to $M_n$.

The results are as follows:

degree of conversion: 43%, average molecular mass $M_n=3500$, polydispersity index PI=1.1.

Example 2.2

Methyl Acrylate Homopolymer

Introduced into a round-bottomed flask are:

1 mmol of dithiocarbamate of formula (A) (0.35 g) and 40 mmol of methyl acrylate (3.44 g).

The temperature is raised to 80° C. and 0.03 mmol of lauroyl peroxide (12.8 mg) is added. The polymerization lasts 6 hours during which 0.02 mmol of lauroyl peroxide is added every two hours.

The polymer is recovered by evaporating, under vacuum, the traces of residual monomer and analysed by GPC in THF medium and in polystyrene equivalents:

degree of conversion: 77%, average molecular mass $M_n$=3000, polydispersity index PI=1.1.

Example 2.3

Styrene Homopolymer/Polymerization Kinetics

A stock solution is prepared by mixing:

5.504 g of styrene, 0.231 g of dithiocarbamate of formula (A) and 11.4 mg of azobis(isobutyronitrile) (AIBN).

Aliquots of about 0.9 g of this solution are dispensed in tubes and heated to 70° C. The polymerization in the various tubes is stopped at different times by cooling and introducing 4 ml of toluene containing 25 mg of hydroquinone.

For each tube, the polymer is recovered by evaporating the toluene and the residual monomer; it is analysed by GPC in THF medium. The masses are given in polystyrene equivalents. The results obtained are given in Table 1.

TABLE 1

| Time (min.) | Conversion (%) | $M_n$ | PI |
| --- | --- | --- | --- |
| 63 | 6.6 | 770 | (*) |
| 126 | 14.4 | 1260 | (*) |
| 240 | 27.4 | 1700 | 1.2 |
| 359 | 37.2 | 2200 | 1.2 |
| 1443 | 80.0 | 4400 | 1.2 |

(*) part of the mass distribution is outside the calibration; the polydispersity index for these specimens cannot therefore be calculated.

Example 2.4

Ethyl Acrylate Homopolymer/Polymerization Kinetics

A stock solution is prepared by mixing:

5.533 g of ethyl acrylate, 0.241 g of dithiocarbamate of formula (A) and 11.3 mg of azobis(isobutyronitrile) (AIBN).

Aliquots of about 10 g of this solution are dispensed in tubes and heated to 70° C. The polymerizations in tubes are stopped at different times by cooling and introducing 4 ml of toluene containing 25 mg of hydroquinone.

For each tube, the polymer is recovered by evaporating the toluene and the residual monomer; it is analysed by GPC in THF medium. The masses are given in polystyrene equivalents. The results obtained are given in Table 2.

TABLE 2

| Time (min.) | Conversion (%) | $M_n$ | PI |
| --- | --- | --- | --- |
| 31 | 1.9 | 323 | (*) |
| 49 | 15.6 | 2100 | 1.7 |
| 101 | 50.6 | 4300 | 1.6 |
| 150 | 63.5 | 5300 | 1.5 |
| 211 | 77.2 | 5900 | 1.6 |

(*) part of the mass distribution is outside the calibration; the polydispersity index for this specimen cannot therefore be calculated.

Example 2.5

Styrene Homopolymer

Introduced into a round-bottomed flask are:

2.23 g of styrene, 84.5 mg of dithiocarbamate of formula (B) and 4.2 mg of lauroyl peroxide.

The temperature is raised to 110° C. The reaction lasts 24 hours during which several additions of lauroyl peroxide are made:

4.7 mg after 2 hours, 4.1 mg after 4 hours.

The polymer is recovered by evaporating, under vacuum, the traces of residual monomer and analysed by GPC in THF medium and in polystyrene equivalents:

degree of conversion: 98.1%, average molecular mass $M_n$=8500, polydispersity index PI=1.3.

Example 2.6

Ethyl Acrylate Homopolymer

Introduced into a round-bottomed flask are:

2.13 g of ethyl acrylate, 84.5 mg of dithiocarbamate of formula (B) and 4.5 mg of lauroyl peroxide.

The temperature is raised to 80° C. The reaction lasts 24 hours during which several additions of lauroyl peroxide are made:

5.0 mg after 2 hours, 3.8 mg after 4 hours.

The polymer is recovered by evaporating, under vacuum, the traces of residual monomer and analysed by GPC in THF medium and in polystyrene equivalents:

degree of conversion: 97.5%.

average molecular mass $M_n$=10,700, polydispersity index PI=1.2.

Example 2.7

Vinyl Acetate Homopolymer

Introduced into a round-bottomed flask are:

1.82 g of vinyl acetate, 85.1 mg of dithiocarbamate of formula (B) and 8.8 mg of lauroyl peroxide.

The temperature is raised to 80° C. The reaction lasts 24 hours during which several additions of lauroyl peroxide are made:

8.1 mg after 2 hours, 8.0 mg after 4 hours.

The polymer is recovered by evaporating, under vacuum, the traces of residual monomer and analysed by GPC in THF medium and in polystyrene equivalents:

degree of conversion: 59.2%, average molecular mass $M_n$=4600, polydispersity index PI=2.0.

Example 2.8

Styrene Homopolymer

Introduced into a round-bottomed flask are:

2.24 g of styrene.

0.113 g of dithiocarbamate of formula (C) and 4.5 mg of lauroyl peroxide.

The temperature is raised to 110° C. The reaction lasts 24 hours during which several additions of lauroyl peroxide are made:

4.7 mg after 2 hours,
3.6 mg after 4 hours.

The polymer is recovered by evaporating, under vacuum, the traces of residual monomer and analysed by GPC in THF medium and in polystyrene equivalents:

degree of conversion: 98.0%,
average molecular mass $M_n$=7600,
polydispersity index PI=1.6.

Example 2.9

Ethyl Acrylate Homopolymer

Introduced into a round-bottomed flask are:

2.13 g of ethyl acrylate,
0.115 g of dithiocarbamate of formula (C) and
4.3 mg of lauroyl peroxide.

The temperature is raised to 80° C. The reaction lasts 24 hours during which several additions of lauroyl peroxide are made:

4.6 mg after 2 hours,
4.9 mg after 4 hours.

The polymer is recovered by evaporating, under vacuum, the traces of residual monomer and analysed by GPC in THF medium and in polystyrene equivalents:

degree of conversion: 95.2%,
average molecular mass $M_n$=8600,
polydispersity index PI=1.4.

Example 2.10

Vinyl Acetate Homopolymer

Introduced into a round-bottomed flask are:

1.84 g of vinyl acetate,
0.112 g of dithiocarbamate of formula (C) and
8.3 mg of lauroyl peroxide.

The temperature is raised to 80° C. The reaction lasts 24 hours during which several additions of lauroyl peroxide are made:

8.8 mg after 2 hours,
8.0 mg after 4 hours.

The polymer is recovered by evaporating, under vacuum, the traces of residual monomer and analysed by GPC in THF medium and in polystyrene equivalents:

degree of conversion: 33%,
average molecular mass $M_n$=2500,
polydispersity index PI=1.4.

Example 2.11

Styrene Homopolymer

Introduced into a round-bottomed flask are:

2.23 g of styrene,
95.1 mg of dithiocarbamate of formula (D) and
4.1 mg of lauroyl peroxide.

The temperature is raised to 110° C. The reaction lasts 24 hours during which several additions of lauroyl peroxide are made:

4.2 mg after 2 hours,
3.9 mg after 4 hours.

The polymer is recovered by evaporating, under vacuum, the traces of residual monomer and analysed by GPC in THF medium and in polystyrene equivalents:

degree of conversion: 97.6%,
average molecular mass $M_n$=6800,
polydispersity index PI=2.0.

Example 2.12

Ethyl Acrylate Homopolymer

Introduced into a round-bottomed flask are:

2.15 g of ethyl acrylate,
98.7 mg of dithiocarbamate of formula (D) and
4.1 mg of lauroyl peroxide.

The temperature is raised to 80° C. The reaction lasts 24 hours during which several additions of lauroyl peroxide are made:

4.5 mg after 2 hours,
4.1 mg after 4 hours.

The polymer is recovered by evaporating, under vacuum, the traces of residual monomer and analysed by GPC in THF medium and in polystyrene equivalents:

degree of conversion: 91.8%,
average molecular mass $M_n$=7900,
polydispersity index PI=1.6.

Example 2.13

Styrene Homopolymer

Introduced into a round-bottomed flask are:

2.23 g of styrene,
87 mg of dithiocarbamate of formula (E) and
4.0 mg of lauroyl peroxide.

The temperature is raised to 110° C. The reaction lasts 24 hours during which several additions of lauroyl peroxide are made:

4.6 mg after 2 hours,
4.6 mg after 4 hours.

The polymer is recovered by evaporating, under vacuum, the traces of residual monomer and analysed by GPC in THF medium and in polystyrene equivalents:

degree of conversion: 97.1%,
average molecular mass $M_n$=8300,
polydispersity index PI=1.4.

Example 2.14

Ethyl Acrylate Homopolymer

Introduced into a round-bottomed flask are:

2.13 g of ethyl acrylate,
88.5 mg of dithiocarbamate of formula (E) and
4.0 mg of lauroyl peroxide.

The temperature is raised to 80° C. The reaction lasts 24 hours during which several additions of lauroyl peroxide are made:

4.5 mg after 2 hours,
4.5 mg after 4 hours.

The polymer is recovered by evaporating, under vacuum, the traces of residual monomer and analysed by GPC in THF medium and in polystyrene equivalents:

degree of conversion: 94.4%,

Example 2.15

Vinyl Acetate Homopolymer

Introduced into a round-bottomed flask are:

1.83 g of vinyl acetate, 97.4 mg of dithiocarbamate of formula (E) and 8.1 mg of lauroyl peroxide.

The temperature is raised to 80° C. The reaction lasts 24 hours during which several additions of lauroyl peroxide are made:

8.5 mg after 2 hours, 8.3 mg after 4 hours.

The polymer is recovered by evaporating, under vacuum, the traces of residual monomer and analysed by GPC in THF medium and in polystyrene. equivalents:

degree of conversion: 23.4%, average molecular mass $M_n$=2100, polydispersity index PI=1.35.

Example 2.16

Vinyl Acetate Homopolymer

Introduced into a glass tube are:

0.015 mmol of AIBN (2.4 mg), 10 mmol of ethyl acrylate (1g) and 0.13 mmol of dithiocarbamate of formula (F) (33.8 mg).

The tube is closed by a screw stopper and then immersed in an oil bath preheated to 80° C. The polymerization lasts 24 hours.

The polymer is recovered by evaporating the traces of residual monomer and analysed by GPC in THF medium and in polystyrene equivalents. The results obtained are as follows:

degree of conversion: 61%, number-average molar mass $M_n$=5600, polydispersity index PI=1.4.

Example 2.17

Styrene Homopolymer

Introduced into a glass tube are:

0.014 mmol of AIBN (2.3 mg), 10 mmol of styrene (1.03 g) and 0.12 mmol of dithiocarbamate of formula (F) (32 mg).

The tube is closed by a screw stopper and then immersed in an oil bath preheated to 115° C. The polymerization lasts 24 hours.

The polymer is recovered by evaporating the traces of residual monomer and analysed by GPC in THF medium and in polystyrene equivalents. The results obtained are as follows:

degree of conversion: 95%, number-average molar mass $M_n$=7200, polydispersity index PI=1.19.

Example 2.18

Methyl Methacrylate Homopolymer

Introduced into a glass tube are:

0.012 mmol of AIBN (2 mg), 10 mmol of ethyl acrylate (1 g), 0.12 mmol of dithiocarbamate of formula (F) (31.7 mg) and 1 g of methyl ethyl ketone.

The tube is closed by a screw stopper and then immersed in an oil bath preheated to 80° C. The polymerization lasts 24 hours.

The polymer is recovered by evaporating the traces of residual monomer and analysed by GPC in THF medium and in polystyrene equivalents. The results obtained are as follows:

degree of conversion: 96%, number-average molar mass $M_n$=13,900, polydispersity index PI=1.64.

Example 2.19

Vinyl Acetate Homopolymer

Introduced into a glass tube are:

0.026 mmol of AIBN (2 mg), 10 mmol of vinyl acetate (0.86 g) and 0.12 mmol of dithiocarbamate of formula (G) (48 mg).

The tube is closed by a screw cock and then immersed in an oil bath preheated to 80° C. The polymerization lasts 24 hours.

The polymer is recovered by evaporating the traces of residual monomer and analysed by GPC in THF medium and in polystyrene equivalents. The results are as follows:

degree of conversion: 21%, number-average molar mass $M_n$=1140, polydispersity index PI=2.32.

Example 2.20

Ethyl Acrylate Homopolymer

Introduced into a glass tube are:

0.013 mmol of AIBN (2.1 mg), 10 mmol of ethyl acrylate (1 g) and 0.12 mmol of dithiocarbamate of formula (G) (48 mg).

The tube is closed by a screw stopper and then immersed in an oil bath preheated to 80° C. The polymerization lasts 24 hours.

The polymer is recovered by evaporating the traces of residual monomer and analysed by GPC in THF medium and in polystyrene equivalents. The results are as follows:

degree of conversion: 62%.

number-average molar mass $M_n$=7500, polydispersity index PI=1.39.

Example 2.21

Styrene Homopolymer

Introduced into a glass tube are:

0.013 mmol of AIBN (2.1 mg).

10 mmol of styrene (1.04 g) and 0.12 mmol of dithiocarbamate of formula (G) (48 mg).

The tube is closed by a screw stopper and then immersed in an oil bath preheated to 115° C. The polymerization lasts 24 hours.

The polymer is recovered by evaporating the traces of residual monomer and analysed by GPC in THF medium and in polystyrene equivalents.

(average molecular mass $M_n$=9700, polydispersity index PI=1.2.)

degree of conversion: 95%,
number-average molar mass $M_n$=5300,
polydispersity index PI=1.28.

Example 2.22

Vinyl Acetate Homopolymer

Introduced into a glass tube are;
0.026 mmol of AIBN (4.2 mg),
10 mmol of vinyl acetate,(0.86 g) and
0.13 mmol of dithiocarbamate of formula (H) (48 mg).

The tube is closed by a screw stopper and hen immersed in an oil bath preheated to 80° C. The polymerization lasts 24 hours.

The polymer is recovered by evaporating the traces of residual monomer and analysed by GPC in THF medium and in polystyrene equivalents. The results are as follows:
degree of conversion: 60%,
number-average molar mass $M_n$=4700,
polydispersity index PI=1.91.

Example 2.23

Ethyl Acrylate Homopolymer

Introduced into a glass tube are:
0.013 mmol of AIBN (2.1 mg),
10 mmol of ethyl acrylate (1 g) and
0.13 mmol of dithiocarbamate of formula (H) (48 mg).

The tube is closed by a screw stopper and then immersed in an oil bath preheated to 80° C. The polymerization lasts 24 hours.

The polymer is recovered by evaporating the traces of residual monomer and analysed by GPC in THF medium and in polystyrene equivalents. The results are as follows:
degree of conversion: 72%,
number-average molar mass $M_n$=6000.
polydispersity index PI=1.48.

Example 2.24

Styrene Homopolymer

Introduced into a glass tube are:
0.013 mmol of AIBN (2.1 mg),
10 mmol of styrene (1.04 g) and
0.12 mmol of dithiocarbamate of formula (H) (48 mg).

The tube is closed by a screw stopper and then immersed in an oil bath preheated to 110° C. The polymerization lasts 24 hours.

The polymer is recovered by evaporating the traces of residual monomer and analysed by GPC in THF medium and in polystyrene equivalents. The results are as follows:
degree of conversion: 87%,
number-average molar mass $M_n$=8200,
polydispersity index PI=1.23.

Example 2.25

Vinyl Acetate Homopolymer

Introduced into a glass tube are:
0. 003 mmol of AIBN (0.6 mg),
10 mmol of vinyl acetate (1 g) and
0.14 mmol of dithiocarbamate of formula (I) (48 mg).

The tube, connected to a vacuum line, is dipped into liquid nitrogen and then three "freezing/vacuum/return to ambient" cycles are carried out on the contents of the tube so as to degas it. Next, it is vacuum sealed. After returning to ambient, it is immersed in an oil bath preheated to 80° C. The polymerization lasts 28 hours.

The polymer is recovered by opening the tube and then evaporating the traces of residual monomer. It is analysed by GPC in THF medium and in polystyrene equivalents. The results are as follows:
degree of conversion: 6.6%
number-average molar mass $M_n$=890
polydispersity index PI=1.24.

Example 2.26

Ethyl Acrylate Homopolymer

Introduced into a glass tube are:
0.003 mmol of AIBN (0.6 mg),
10 mmol of ethyl acrylate (1 g) and
0.13 mmol of dithiocarbamate of formula (I) (42 mg).

After the tube has been filled, it is degassed and vacuum sealed in a manner similar to Example 2.25. The polymerization lasts 64 hours at 80° C.

The polymer is recovered by evaporating the traces of residual monomer and analysed by GPC in THF medium and in polystyrene equivalents. The results are as follows:
degree of conversion: 69%
number-average molar mass $M_n$=9500
polydispersity index PI=1.2.

Example 2.27

Styrene Homopolymer

Introduced into a glass tube are:
9.6 mmol of styrene (1 g) and
0.12 mmol of dithiocarbamate of formula (I) (40.2 mg).

After the tube has been filled, it is degassed and vacuum sealed in a manner similar to Example 2.25. The polymerization lasts 72 hours at 110° C.

The polymer is recovered by evaporating the traces of residual monomer and analysed by GPC in THF medium and in polystyrene equivalents. The results are as follows;
degree of conversion: 70%
number-average molar mass $M_n$=6200
polydispersity index PI=1.14.

Example 2.28

Vinyl Acetate Homopolymer

Introduced into a glass tube are:
0.003 mmol of AIBN (0.6 mg),
10 mmol of vinyl acetate (1 g) and
0.15 mmol of dithiocarbamate of formula (J) (56 mg).

After the tube has been filled, it is degassed and vacuum sealed in a manner similar to Example 2.25. The polymerization lasts 27 hours at 80° C.

The polymer is recovered by evaporating the traces of residual monomer and analysed by GPC in THF medium and in polystyrene equivalents. The results are as follows:
degree of conversion: 25.7%
number-average molar mass $M_n$=2200
polydispersity index PI=1.66.

Example 2.29

Ethyl Acrylate Homopolymer

Introduced into a glass tube are:

0.003 mmol of AIBN (0.6 mg), 10 mmol of ethyl acrylate (1 g) and 0.13 mmol of dithiocarbamate of formula (J) (48 mg).

After the tube has been filled, it is Degassed and vacuum sealed in a manner similar to Example 10. The polymerization lasts 64 hours at 80° C.

The polymer is recovered by evaporating the traces of residual monomer and analysed by GPC in THF medium and in polystyrene equivalents. The results are as follows:

degree of conversion: 76% number-average molar mass $M_n$=6700 polydispersity index PI=1.2.

Example 2.30

Vinyl Acetate Homopolymer

Introduced into a glass tube are:

0.016 mmol of AIBN (2.7 mg), 50 mmol of vinyl acetate (4.3 g) and 0.62 mmol of dithiocarbamate of formula (K) (251 mg).

After the tube has been filled, it is degassed and vacuum sealed in a manner similar to Example 2.25. The polymerization lasts 41 hours at 80° C.

The polymer is recovered by evaporating the traces of residual monomer and analysed by GPC in THF medium and in polystyrene equivalents. The results are as follows:

degree of conversion: 47.8% number-average molar mass $M_n$=5000 polydispersity index PI=1.43.

Example 2.31

Ethyl Acrylate Homopolymer

Introduced into a glass tube are:

0.003 mmol of AIBN (0.56 mg), 10 mmol of ethyl acrylate (1 g) and 0.12 mmol of dithiocarbamate of formula (K) (50 mg).

After the tube has been filled, it is degassed and vacuum sealed in a manner similar to Example 2.25. The polymerization lasts 21 hours at 80° C.

The polymer is recovered by evaporating the traces of residual monomer and analysed by GPC in THF medium and in polystyrene equivalents. The results are as follows:

degree of conversion: 67% number-average molar mass $M_n$=5900 polydispersity index PI=1.22.

Example 2.32

Styrene Homopolymer

Introduced into a round-bottomed flask are:

0.026 mmol of lauroyl peroxide (4.3 mg), 21.3 mmol of styrene (2.22 g) and 0.27 mmol of dithiocarbamate of formula (K) (108 mg).

The flask is surrounded by a refrigerant, placed under a stream of nitrogen and immersed in an oil bath preheated to 115° C. Two new additions of lauroyl peroxide are carried out after two and four hours of reaction (0.026 mmol each time). The reaction is stopped after 24 hours.

The polymer is recovered by evaporating the traces of residual monomer and analysed by GPC in THF medium and in polystyrene equivalents. The results are as follows:

degree of conversion: 98% number-average molar mass $M_n$=6700 polydispersity index PI=1.7.

Example 2.33

Vinyl Acetate Homopolymer

Introduced into a glass tube are:

0.004 mmol of AIBN (0.6 mg), 11.6 mmol of vinyl acetate (1 g) and 0.146 mmol of dithiocarbamate of formula (K) (49.8 mg).

After the tube has been filled, it is degassed and vacuum sealed in a manner similar to Example 2.25. The polymerization lasts 100 hours at 60° C.

The polymer is recovered by evaporating the traces of residual monomer and analysed by GPC in THF medium and in polystyrene equivalents. The results are as follows:

degree of conversion: 71.4% number-average molar mass $M_n$=5400 polydispersity index PI=1.29.

3-Synthesis of Block Copolymers of Formula (IA)

Example 3.1 p(EtA-b-St) Block Copolymer

A stock solution is prepared from:

4.01 g of ethyl acrylate, 0.176 g of dithiocarbamate of formula (A) and 8.8 mg of AIBN.

1.06 g of this solution are introduced into a round-bottomed flask. The temperature is raised to 70° C. The polymerization lasts 24 hours after which the traces of residual monomer are removed by evaporation.

A small fraction of the polymer obtained is removed and analysed by GPC in THF medium and in polystyrene equivalents:

degree of conversion: 81.5% average molecular mass $M_n$=7300 polydispersity index PI=1.4.

Introduced into the flask are:

2.08 g of styrene and 4.4 mg of AIBN.

The temperature is raised to 70° C. The polymerization lasts 40 hours.

The traces of residual monomer are removed by evaporation and the copolymer is analysed by GPC in THF medium and in polystyrene equivalents:

degree of conversion: 93.8% average molecular mass $M_n$=20,100 polydispersity index PI=1.2.

Example 3.2 p(EtA-b-VA) Block Copolymer 1.38 g of the stock solution prepared for Example 3.1 are introduced into a round-bottomed flask. The temperature is raised to 70° C. The polymerization lasts 24 hours after which the traces of residual monomer are removed by evaporation.

A small fraction of the polymer obtained is removed and analysed by GPC in THF medium and in polystyrene equivalents:

degree of conversion: 72.4% average molecular mass $M_n$=5100 polydispersity index PI=1.4.

Introduced into the flask are:

1.72 g of vinyl acetate and 4.2 mg of AIBN.

The temperature is raised to 70° C. The polymerization lasts 40 hours.

The traces of residual monomer are removed by evaporation and the copolymer is analysed by GPC in THF medium and in polystyrene equivalents:

degree of conversion: 15.6% average molecular mass M=7200 polydispersity index PI=1.5.

Example 3.3 p(St-b-EtA) Block Copolymer

A stock solution is prepared from:

4.01 g of styrene, 0.168 g of dithiocarbamate of formula (A) and 8.3 mg of AIBN.

1.00 g of this solution is removed and introduced into a round-bottomed flask. The temperature is raised to 70° C. The polymerization lasts 24 hours after which the traces of residual monomer are removed by evaporation.

A small fraction of the polymer obtained is removed and analysed by GPC in THF medium and in polystyrene equivalents:

degree of conversion: 86.9% average molecular mass $M_n$=4500 polydispersity index PI=1.3.

Introduced into the flask are:

1.92 g of ethyl acrylate and 3.7 mg of AIBN.

The temperature is raised to 70° C. The polymerization lasts 40 hours.

The traces of residual monomer are removed by evaporation and the copolymer is analysed by GPC in THF medium and in polystyrene equivalents:

degree of conversion: 94.8% average molecular mass $M_n$=14,100.

polydispersity index PI=1.7.

Example 3.48 p(EtA-b-St) Block Copolymer

A stock solution is prepared from:

7.5 ml of ethyl acrylate 3.9 mg of AIBN ($2.4 \times 10^{-5}$ mol)

1.08 ml of this solution are introduced into a glass tube and then 50.5 mg ($1.25 \times 10^{-4}$ mol) of precursor of formula K are added. The contents of the tube are degassed by three "freeze-vacuum-return to ambient" cycles and then vacuum sealed. The tube is then placed for 21 hours in an oil bath maintained at 80° C. At the end of the reaction, the tube is opened and the monomer residues are removed by vacuum evaporation.

The characteristics of the polymer obtained are as follows:

degree of conversion: 67.4% average molar mass $M_n$: 5500 polydispersity index PI=1.22.

Introduced into a glass tube are:

0.75 g of styrene 1 ml of toluene 1.65 mg of AIBN 0.5 g of polyethyl acrylate obtained above.

After the tube has been degassed in the same way as that described above, it is vacuum sealed. After 72 hours at 110° C. the tube is opened and the monomer residues are removed by vacuum evaporation.

The characteristics of the copolymer obtained are as follows:

degree of conversion: 49.4% average molar mass $M_n$: 8500 polydispersity index: PI=1.34.

Example 3.5

(EtA-b-St) Block Copolymer

A stock solution is prepared from:

5.4 ml of ethyl acrylate 3 mg of AIBN ($2.4 \times 10^{-5}$ mol)

1.08 ml of this solution are introduced into a glass tube and then 41.8 mg ($1.1 \times 10^{-4}$ mol) of precursor of formula I are added. The contents of the tube are degassed by three "freeze-vacuum-return to ambient" cycles and then vacuum sealed. The tube is then placed for 21 hours in an oil bath maintained at 80° C. At the end of the reaction, the tube is opened and the monomer residues are removed by vacuum evaporation.

The characteristics of the polymer obtained are as follows:

degree of conversion: 69.7% average molar mass $M_n$: 7050 polydispersity index PI=1.2.

Introduced into a glass tube are:

1 g of styrene 1 ml of toluene 2 mg of AIBN 0.72 g of polyethyl acrylate obtained above.

After the tube has been degassed in the same way as that described above, it is vacuum sealed. After 72 hours at 110° C., the tube is opened and the monomer residues are removed by vacuum evaporation.

The characteristics of the copolymer obtained are as follows:

degree of conversion: 26.1% average molar mass $M_n$: 12,900 polydispersity index: PI=1.29.

What is claimed is:

1. A process for preparing block polymers of general formula (IA) or (IB):

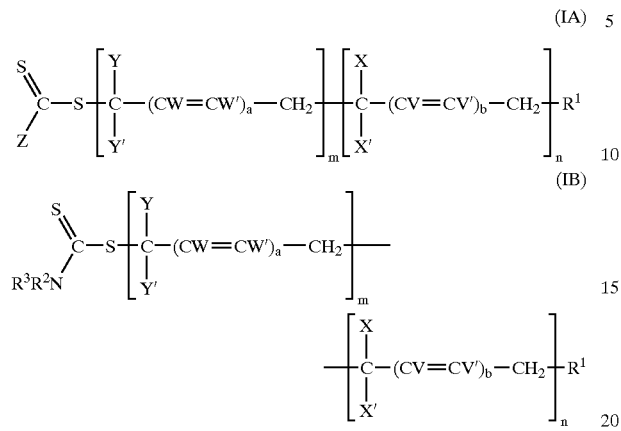

in which formulae:
R$^1$ represents:
an optionally substituted alkyl, acyl, aryl, alkene or alkyne group (i),
an optionally substituted or aromatic, saturated or unsaturated, carbocycle (ii), or
an optionally substituted or aromatic, saturated or unsaturated, heterocycle (iii),
optionally, these groups and rings (i), (ii) and (iii) are substituted with substituted phenyl groups, substituted aromatic groups, or groups: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, organosilyl, groups having a hydrophilic or ionic character,
R representing an alkyl or aryl group,
Z is an optionally substituted ring comprising a nitrogen atom via which Z is linked to the C(=S)—S-group of formula (IA), the other atoms of said ring inducing a delocalizing or electron-withdrawing effect with respect to the electron density of the nitrogen atom,
R$^2$ and R$^3$, which are identical or different, represent:
an optionally substituted alkyl, acyl, aryl, alkene or alkyne group (i),
an optionally substituted or aromatic, saturated or unsaturated, carbocycle (ii), or
an optionally substituted, saturated or unsaturated, heterocycle (iii),
optionally, these groups and rings (i), (ii) and (iii) are substituted with:
substituted phenyl groups or substituted aromatic groups,
groups: alkoxycarbonyl or aryloxycarbonyl (—COOR), carboxyl:(—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl,
groups having a hydrophilic or ionic character,
R representing an alkyl or aryl group, and, for at least R$^2$ or R$^3$, these groups and rings (i), (ii) and (iii) induce a delocalizing or electron-withdrawing effect with respect to the electron density of the nitrogen atom to which R$^2$ and R$^3$ are linked, V, V', W and W', which are identical or different, represent: H, an alkyl group or a halogen, X, X', Y and Y', which are identical or different, represent H, a halogen, a group R', OR', OCOR', NHCOH, OH, NH$_2$, NHR', N(R')$_2$, (R')$_2$N$^+$O$^-$, NHCOR', CO$_2$H, CO$_2$R', CN, CONH$_2$, CONHR'or CONR'$_2$, wherein R' is alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups, a and b, which are identical or different, are equal to 0 or 1, m and n, which are identical or different, are greater than 1, the individual repeat units being identical or different, said process comprising the step of bringing into contact with each other:
an ethylenically unsaturated monomer of formula:

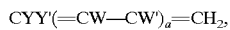

a precursor compound of general formula (IIA) or (IIB):

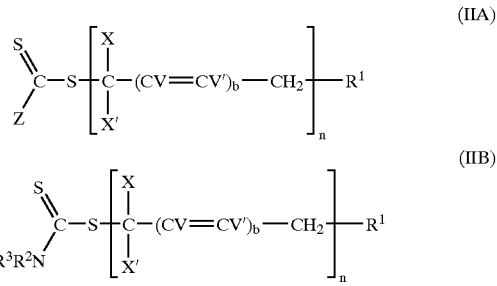

wherein Z, X, X', V, V', R$^1$, R$^2$ and R$^3$ have the same meaning, and b and n the same value, as previously; and a radical polymerization initiator compound, and wherein said block polymers have a polydispersity index of at most 1.5.

2. A process according to claim 1, wherein the ethylenically unsaturated monomer is styrene, butadiene, chloroprene, (meth)acrylic esters, or vinyl nitrites.

3. A process according to claim 1, wherein, in compounds of formula (IA) and (IIA), the ring Z is a ring made of carbon atoms.

4. A process according to claim 1, wherein the ring Z further comprises at least one heteroatom other than the nitrogen which links the ring Z to —C(=S)S, this heteroatom being O, S, N or P.

5. A process according to claim 1, wherein, in the compounds of formula (IA) and (IIA), the ring Z is an aromatic ring.

6. A process according to claim 1, wherein, in the compounds of formula (IA) and (IIA), the ring Z comprises at least one of the following functional groups: carbonyl (C=O), SO$_2$, POR", R" representing an alkyl, aryl, OR, SR or NR$_2$ group, wherein the R group is identical or different and represents an alkyl or aryl group.

7. A process according to claim 1, wherein, in the compounds of formula (IA) and (IIA), the ring Z is substituted with at least one of the following groups: alkyl, aryl, alkoxycarbonyl or aryloxycarbonyl (—COOR), carboxyl (—COOH), acyloxy (—O$_2$CR), carbamoyl (—CONR$_2$), R representing an alkyl or aryl group, cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, S-aryl, groups having a hydrophilic or ionic character, polyalkylene oxide chains, or cationic substituents.

8. A process according to claim 1, wherein, in the compounds of formula (IA) and (IIA), the ring Z is substituted with at least one carbocycle or a heterocycle, optionally aromatic or substituted.

9. A process according to claim 8, wherein, in the compounds of formula (IA) and (IIA), the ring Z and its cyclic substituent have two common atoms.

10. A process according to claim 1, wherein the ring Z is one of the following rings:

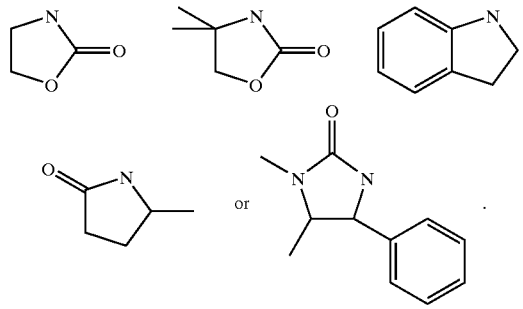

11. A process according to claim 1, wherein, in compounds of formula (IB) and (IIB), $R^2$ or $R^3$ exert a $\pi$ withdrawing effect.

12. A process according to claim 1, wherein $R^2$ or $R^3$ represent a carbonyl or (hetero)aromatic group.

13. A process according to claim 12, wherein, in compounds of formula (IB) and (IIB), $R^2$ or $R^3$ exert a $\Sigma$ withdrawing effect.

14. A process according to claim 1, wherein $R^2$ or $R^3$ represent an alkyl group substituted with electron-withdrawing groups.

15. A process according to claim 1, wherein $R^1$ is one of the following groups:

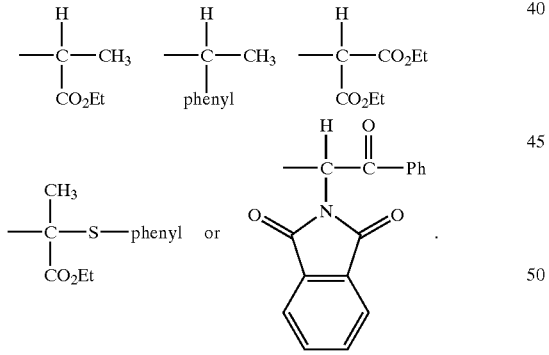

16. A process according to claim 1, wherein the precursor compound of general formula (IIA) is a polymer coming from the radical polymerization of an ethylenically unsaturated monomer of formula: $CXX'(=CV—CV')_b=CH_2$ during which said monomer is brought into contact with a radical polymerization initiator compound and a compound of general formula (IIIA) or (IVA):

(IIIA)

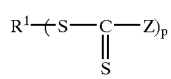

(IVA)

p being between 2 and 10.

17. A process according to claim 16, wherein the compound of formula (IIIA) is a compound of the following formulae:

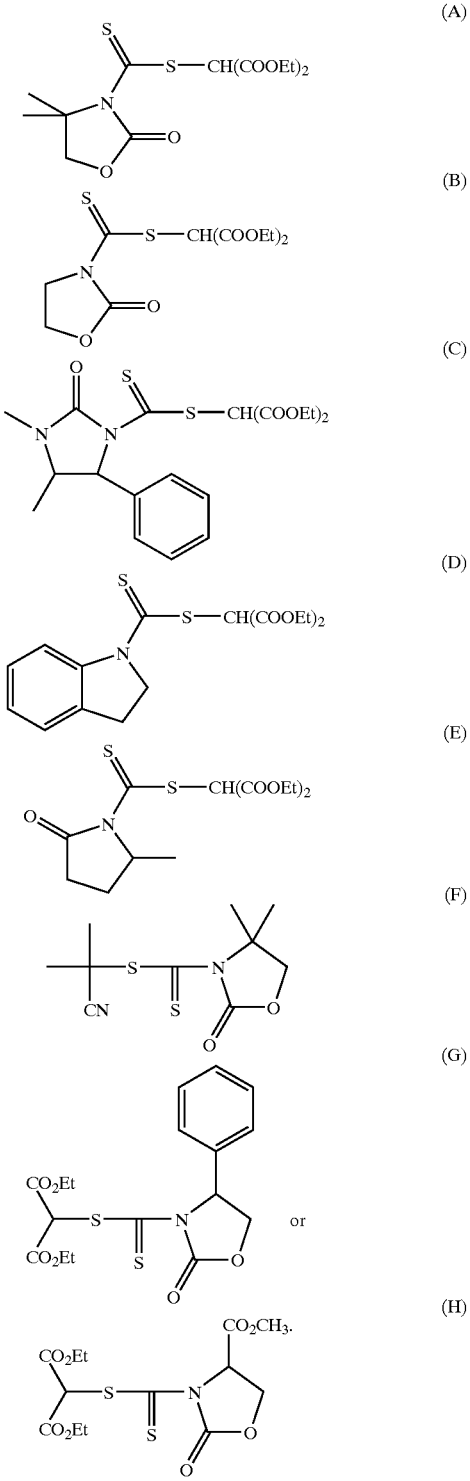

18. A process according to claim 1, wherein the precursor compound of general formula (IIB) is a polymer coming from the radical polymerization of an ethylenically unsaturated monomer of formula: $CXX'(=CV-CV')_b=CH_2$ during which said monomer is brought into contact with a radical polymerization initiator compound and a compound of general formula (IIIB), (IVB) or (VB):

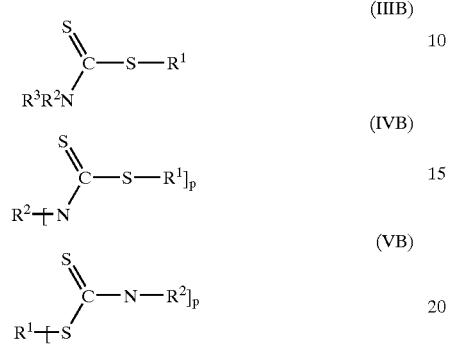

p being between 2 and 10.

19. A process according to claim 18, wherein the compound of formula (IIIB) is a compound of the following formulae:

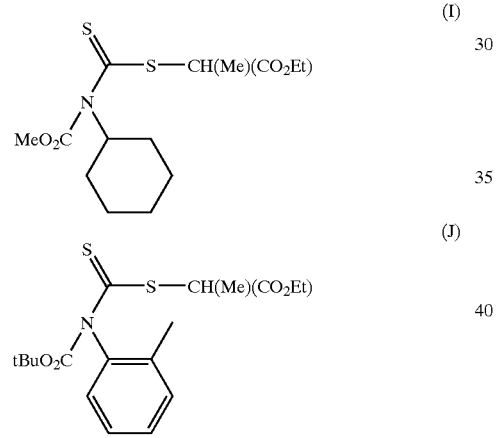

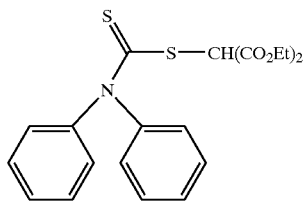

or

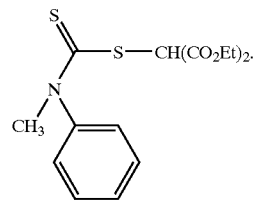

20. A process for preparing multiblock polymers, comprising the step of:

a) repeating at least once the implementation of the process of claim 1, using:
different monomers from those of the previous implementation, and
instead of the precursor compound of formula (IIA) or (IIB), the block polymer coming from the previous implementation.

21. The process of producing block polymers according to claim 1 in which the block polymers have at least two polymer blocks chosen from the following combinations:
polystyrene/polymethyl acrylate,
polystyrene/polyethyl acrylate,
polystyrene/poly(tert-butyl acrylate),
polyethyl acrylate/polyvinyl acetate,
polybutyl acrylate/polyvinyl acetate, or
poly(tert-butyl acrylate)/polyvinyl acetate.

22. A process according to claim 1, wherein groups having a hydrophilic or ionic character are alkali metal salts of carboxylic acids alkali metal salts of sulphonic acid, polyalkylene oxide chains (PEO, PPO), or quaternary ammonium salts.

* * * * *